(12) United States Patent  
Greger

(10) Patent No.: US 12,485,396 B2  
(45) Date of Patent: Dec. 2, 2025

(54) MAGNETIC FIELD PARTICLE CONFINEMENT IN ROTARY TUBE FURNACE

(71) Applicant: NIRON MAGNETICS, INC., Minneapolis, MN (US)

(72) Inventor: Richard W. Greger, Saint Paul, MN (US)

(73) Assignee: NIRON MAGNETICS, INC., Minneapolis, MN (US)

( * ) Notice: Subject to any disclaimer, the term of this patent is extended or adjusted under 35 U.S.C. 154(b) by 854 days.

(21) Appl. No.: 17/771,100

(22) PCT Filed: Oct. 23, 2020

(86) PCT No.: PCT/US2020/057160  
§ 371 (c)(1),  
(2) Date: Apr. 22, 2022

(87) PCT Pub. No.: WO2021/081400  
PCT Pub. Date: Apr. 29, 2021

(65) Prior Publication Data  
US 2022/0379278 A1 Dec. 1, 2022

Related U.S. Application Data

(60) Provisional application No. 62/925,298, filed on Oct. 24, 2019.

(51) Int. Cl.  
*B01J 19/08* (2006.01)  
*B01F 29/63* (2022.01)  
(Continued)

(52) U.S. Cl.  
CPC ............... *B01J 6/002* (2013.01); *B01F 29/63* (2022.01); *B01F 33/451* (2022.01);  
(Continued)

(58) Field of Classification Search  
CPC ........ B01J 6/002; B01J 19/006; B01J 19/087; B01J 2219/00777; B01J 2219/0852;  
(Continued)

(56) References Cited

U.S. PATENT DOCUMENTS

| | | |
|---|---|---|
| 3,661,553 A | 5/1972 | Frans |
| 4,039,794 A | 8/1977 | Kasper |

(Continued)

FOREIGN PATENT DOCUMENTS

CN 2915265 Y 6/2007

OTHER PUBLICATIONS

International Patent Application No. PCT/US2020/057160; Int'l Preliminary Report on Patentability; dated May 5, 2022; 7 pages.

(Continued)

*Primary Examiner* — Huy Tram Nguyen  
(74) *Attorney, Agent, or Firm* — BakerHostetler

(57) ABSTRACT

Disclosed herein is a rotary tube furnace configured to facilitate a chemical reaction between a solid mass and a gas in the furnace. The rotary tube furnace may comprise a reaction chamber extending through the furnace, the reaction chamber configured to control ingress and egress of each of the solid mass and the gas in the reaction chamber; a passage way configured to supply the solid mass to the reaction chamber; a passage way configured to supply the gas to the reaction chamber and circulate the gas through the reaction chamber; a heater providing heat to the reaction chamber and configured to control a reaction temperature in the reaction chamber; a magnetic field source in proximity to the reaction chamber for generating a magnetic field to one or more reaction zones of the reaction chamber; wherein the reaction chamber provides for mixing the solid mass and the gas.

7 Claims, 6 Drawing Sheets

Rotating tube, opposing magnets, fields diverging

Stationary tube, opposing magnets, fields converging  
Simulates packed bed

(51) Int. Cl.
*B01F 33/451* (2022.01)
*B01J 6/00* (2006.01)
*B01J 19/00* (2006.01)

(52) U.S. Cl.
CPC ........... *B01J 19/006* (2013.01); *B01J 19/087* (2013.01); *B01J 2219/00777* (2013.01); *B01J 2219/0852* (2013.01); *B01J 2219/0858* (2013.01); *B01J 2219/0862* (2013.01); *B01J 2219/0871* (2013.01); *B01J 2219/0886* (2013.01); *B01J 2219/182* (2013.01); *B01J 2219/1943* (2013.01)

(58) Field of Classification Search
CPC ........ B01J 2219/0858; B01J 2219/0862; B01J 2219/0871; B01J 2219/0886; B01J 2219/182; B01J 2219/1943; B01F 29/63; B01F 33/451

USPC ......................................................... 422/129
See application file for complete search history.

(56) References Cited

U.S. PATENT DOCUMENTS

| | | | |
|---|---|---|---|
| 4,230,560 A | | 10/1980 | Nakajima |
| 4,252,969 A | * | 2/1981 | Broering .................... C08J 3/16 |
| | | | 264/9 |
| 4,352,969 A | | 10/1982 | Wulf |
| 5,975,310 A | | 11/1999 | Darling et al. |
| 2018/0154370 A1 | | 6/2018 | Zhang |

OTHER PUBLICATIONS

International Search Report from PCT/US2020/057160 as prepared by the ISA/US; mailed Jan. 22, 2021.

* cited by examiner

Stationary tube, opposing magnets, fields converging
Simulates packed bed

Rotating tube, opposing magnets, fields diverging

MAGNETIC FIELD PARTICLE CONFINEMENT IN ROTARY TUBE FURNACE

CROSS-REFERENCE TO RELATED APPLICATIONS

This application is a National Stage of International Patent Application No. PCT/US2020/057160, filed Oct. 23, 2020, and claims the priority of U.S. Provisional Patent Application No. 62/925,298, filed Oct. 24, 2019, the disclosures of which are incorporated herein by reference in their entirety.

FIELD OF THE INVENTION

The present invention provides a rotary tube furnace suitable for operation in controlled

BACKGROUND

A tube furnace reactor is commonly used to batch process solid raw materials in a gaseous environment. In order to produce a homogeneous product, raw materials, typically in particulate or granular form, must be uniformly exposed to process conditions (i.e. temperature, atmosphere). In a standard tube furnace reactor, a stationary tube passes through a furnace shell. Raw materials are loaded into the tube. The furnace supplies heat to the tube via Infrared (IR)/convection and process gasses may either charge the tube in steps, or continuously flow through the tube. In such a stationary tube, temperature gradients within the charge of raw materials and diffusion of process gasses through the bulk of the sample may lead to nonuniform processing conditions throughout the run, which result in an inhomogeneous product.

To alleviate these problems, a Rotary Tube Furnace (RTF) may be used to continually mix raw materials, thus providing more uniform exposure to gasses and heat. In a RTF, the tube simply rotates, turning the furnace into a batch rotary drum reactor. As the tube rotates, raw materials are carried up to the tube wall and fall or roll over trailing materials, which causes continual mixing action, similar to that of a clothes dryer. During this process, any deviation from the rotational field or runout in tube wall may lead to materials moving towards either end of the tube. For example, such diversion is shown in FIG. 1. For a rotating tube and opposing pole magnets, the fields diverge and the tube contents are along the tube interior. For a stationary tube and opposing magnets, the fields converge and tube contents simulates a packed bed.

Process gasses are generally supplied at room temperature. As the tube passes through the walls of the furnace, a temperature gradient exists within the interior of the tube. For processes that are especially sensitive to temperature, even a slight deviation from a target temperature may result in significant or total yield loss. Additionally, as gasses supplied to the system may be reacting as they are heated, supplying an additional gradient in reactant gas can affect the overall reaction process. Another issue observed in RTF processing is particles adhering to the tube wall. As material builds up on the wall, the system begins to approximate a standard (non-rotating tube furnace), and will be subject to the shortcomings described above.

SUMMARY

A rotary tube furnace is provided to facilitate a chemical reaction between a solid mass and a gas in the furnace. The rotary tube furnace includes a reaction chamber extending through the furnace, the reaction chamber configured to control ingress and egress of each of the solid mass and the gas in the reaction chamber; a passage way configured to supply the solid mass to the reaction chamber; an passage way configured to supply and circulate the gas through the reaction chamber; a heater connected to the reaction chamber and configured to control a reaction temperature in the reaction chamber; a magnetic field source in proximity to the reaction chamber for generating a magnetic field and to define one or more reaction zones, where the reaction chamber rotates and provides for mixing the solid mass and the gas.

DETAILED DESCRIPTION

In the present description, the names of only the major phases are used, for the sake of clarity. The material undergoing various stages or phases of reduction, as it passes through the rotating tube furnace, prior to the final reduction to reduced metal, may be referred to herein as "feed material", even though its stoichiometric composition may change by reduction from the entering feed material. The particle size of the feed material may vary. In general, the larger the particle size, the longer will be the residence time in the reaction zone since, when the particles are larger, the reducing gas may require a longer time to diffuse into the particles. In a certain embodiment, an average particle size of the feed material may be between about 1 and about 200 microns. In another embodiment, the feed material may include solid iron-containing material.

A rotary tube as a reaction chamber typically includes a cylindrical portion. The rotary tube may include a straight wall as in FIG. 2. In some instances, the rotary tube may include a flared portion or "bell-shaped" section. For example, the rotary tube may include a flared wall tube, or a flared wall tube with ribs as in FIGS. 2 and 3. A rotary tube furnace adapted to treat materials include the rotary tube and is configured to rotate the rotary tube about its longitudinal axis during a gas-solid reaction. The rotary tube furnace may be computer controlled and the temperature, gas mass flow rate, are separately controlled. The composition of a reducing gas at a furnace outlet may be monitored to provide control of the reduction and/or nitriding temperature, time, and/or mass flow rate. The rotary tube may be rotated by means of a drive shaft attached to the rotary tube through a connection to transmit rotational torque directly or indirectly from a rotational source, such as a motor source (not shown), through the drive shaft to the rotary tube. In an operation, the rotary tube is brought up to an operating temperature while the rotary tube is revolving.

Figure 4:
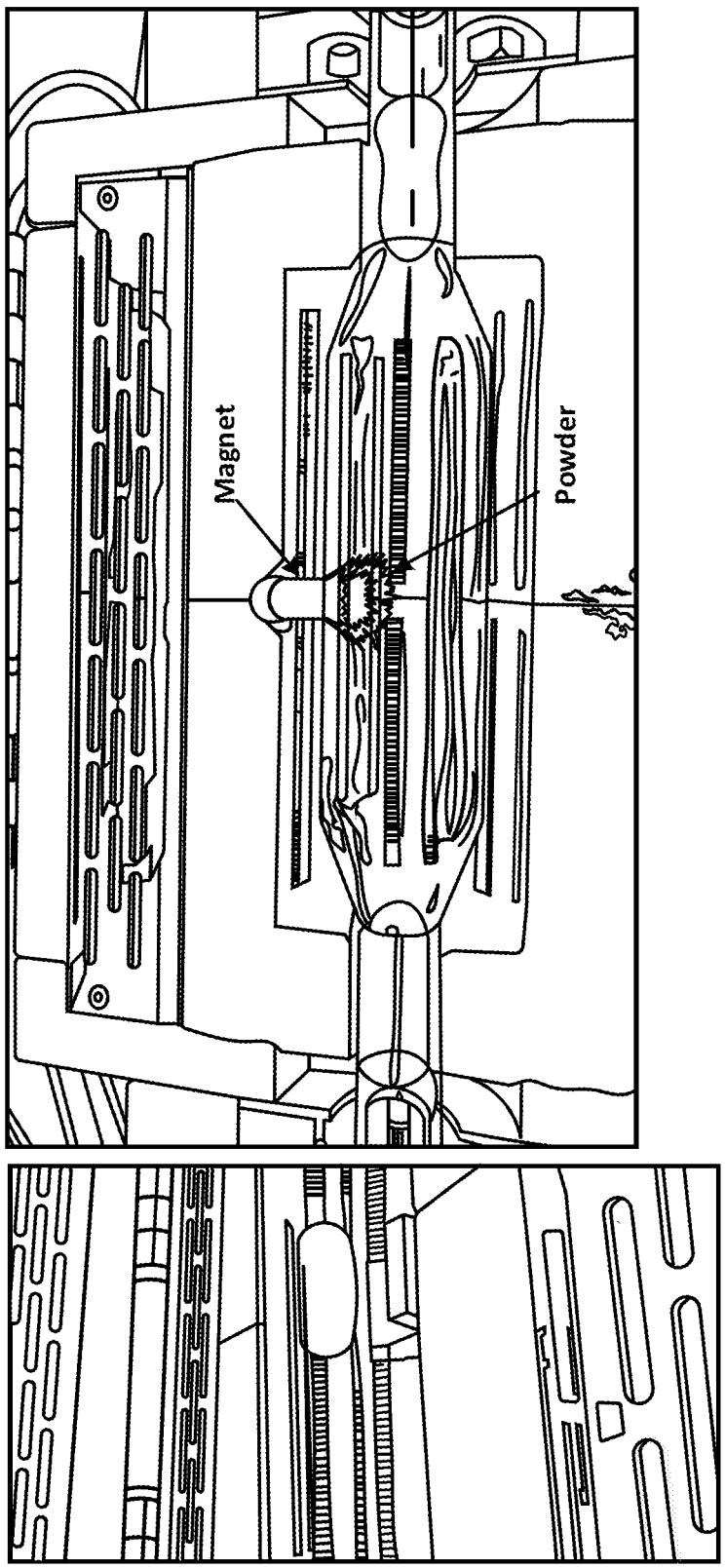
FIG. 4 is an image showing the iron-containing feed particulates in a rotary tube furnace with the magnets placed in the environs of the rotary tube within a heating chamber in the furnace.

The feeding section of the rotary tube is filled with the feed material to be reduced. FIG. 4 is an image of an example rotary tube with magnet and powder feed material as the tube contents shown. In certain aspects, an inert gas may be introduced in the rotary tube and removed. The reducing gas is admitted to within the rotary tube subsequently. The reduction process is carried out in a reducing atmosphere. The reducing atmosphere may include a reducing gas such as hydrogen. During the reduction process, the reducing gas passes through the rotary tube. The rotary tube furnace is a hydrogen-capable rotary tube furnace that provides an appropriate residence time and temperature requirements. Hydrogen may create micro-channels in the feeding material for further reducing processes. The rotary tube furnace may provide a combination of heat transfer and gas-solid interaction. For example, the bulk iron-containing material may be exposed to $H_2$ at a temperature in the range of from about 200° C. to about 500° C. for up to about 10 hours in the rotary tube. In some examples, the material may be exposed to $H_2$ at a temperature in the range of from about 300° C. to about 500° C. For example, a furnace load of 0.5 to 2.0 grams of iron oxide may be reduced to iron in a $H_2$ mass flow rate from 50 to 250 sccm in a rotary tube with an internal diameter of 1" to 4".

The heating zone in the tube, which may include one or more sections of the tube, is heated with one or more heating elements in the rotary tube furnace. A single or multiple heating elements may be mounted either horizontally or vertically or both, outside of the rotary tube within a heating chamber of the rotary tube furnace. The heating elements are arranged to provide one or heating zones within the rotary tube. A heating reaction zone(s) is associated with a reaction or gas-solid reaction zone. The reaction zone is usually determined by thermal profiling of the rotary tube and is subsequently set at a specific temperature or within a temperature range. The configuration of heating elements is arranged to provide flexibility for single or multiple heating and/or reaction zones of the tube sections within the tube, allowing for thermal profiling and scaling up capabilities. Alternatively, variations in power input may be made to allow for gradual increase or decrease in temperature as particulate feed material passes through the reaction zone(s). In principle, the heating element may employ direct or indirect heating. The heating of the rotary tube and the reducing gas stream passed into the rotary tube is determined via the temperature of the feed material, reducing gas and/or the gas-solid reaction temperature in the rotary tube. In a certain embodiment, the temperature of the reaction zone may be monitored by means of a thermo-sensor projecting into the rotary tube.

The reaction rate is moderated by controlling the thermal cycle. In a certain embodiment, the feed material may enter the rotary tube at a pre-determined temperature so that excessively rapid reduction does not occur. The feed material may then be heated at a controlled rate to be reduced. The reduction process takes place gradually and continuously. As the particles of the feed material enter the reaction zone, considerable reduction occurs. The residence time in the reaction zone may depend on the loading of the feed material. In certain aspects, together with temperature, the atmospheric pressure within the tube may be monitored and adjusted to achieve a desirable reaction rate. In another aspect, the residence for a batch process may be the time programmed into a furnace controlled. In a continuous process, the residence in tube may be determined by the speed of a conveyer system moving the feed material through the reaction zone.

Figure 5:
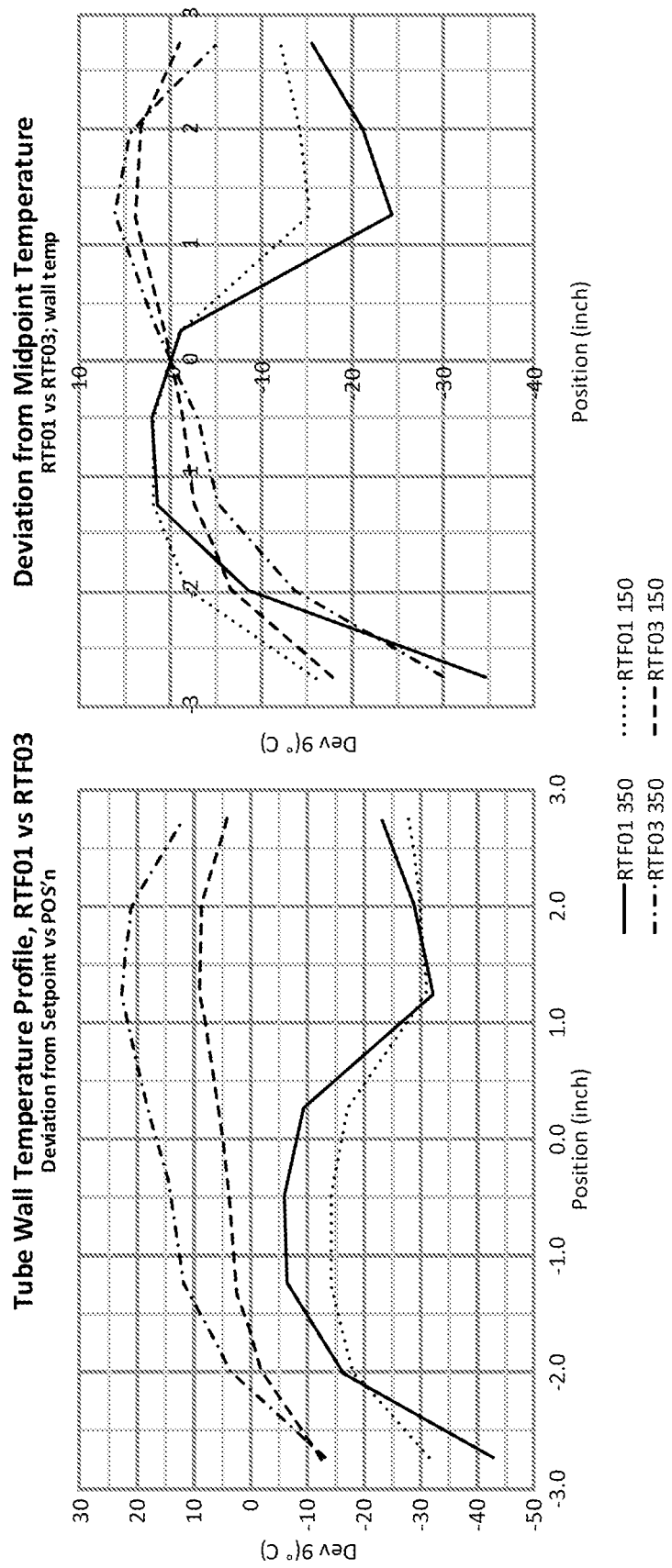
FIG. 5 is a graphical representation of the temperature profile for example rotary tubes along the length of the furnace and includes deviation from midpoint temperature.

A magnetic field generating element is placed such that a magnetic field can be applied at an appropriate position within the rotary tube. The magnetic field generating element includes permanent magnet, electromagnet, or a combination thereof. The magnetic field may be applied perpendicularly to the tube's surface. For example, a permanent magnet or an electromagnet can be placed in the environs of the rotary tube. In a certain embodiment, a combination of two or more magnetic fields may be provided to further define one or more gas-solid reaction zones. The magnetic attractive force applied to the feed material may further define a gas-solid reaction zone with the reducing gas. For example, in a batch process, the magnetic field may coincide with the location of the feed material placed within the tube. In a continuous process, the magnet may not necessarily be at the location where the feed material enters the rotary tube. The location of the magnetic field generating element may be decided in accordance with the temperature profile of the rotary tube with respect to the heating so that the maximum reduction rate can be achieved in the gas-solid reaction zone. For example, the temperature profile may be measured along the length of the furnace to determine the locations of the reaction zone and/or the magnets. FIG. 5 shows a typical tube wall temperature profile for example rotary tubes RTF01 and RTF03. Shown are the deviation from setpoint versus position and the deviation from midpoint temperature according to the wall temperature.

The strength of the magnetic field required to attract the feed material may differ according to the character of the feed material as well as the location where the magnetic field is established within the tube. In certain aspects, the character may include the magnetic susceptibility of the feed material. In some aspect, non-ferromagnetic feed material may become ferromagnetic after being reduced to iron under the magnetic field which pulls the reduced iron into the reaction zone prior to nitriding.

In certain aspects, a magnetic field may be applied to the feed material to align or substantially align the magnetic easy direction of the particles with a magnetic field direction. Thus, the applied magnetic field may increase the likelihood that some or all reduced particles may have a similar crystallographic orientation. Material with multiple iron crystals with a substantially similar crystallographic orientation or a preferred crystallographic orientation may increase magnetic anisotropy of the material. In some examples, the electromagnet may be a conventional copper-wound electromagnet that produces a field from 0.1 to 2.5 Tesla, depending on the design. In various examples, the applied magnetic field may be in the range of from 5 T to about 20 T at an elevated temperature higher than room temperature. In other examples, the applied magnetic field may be in the range of from 10 T to about 18 T. For example, the electromagnet may include a superconducting magnet which generates magnetic fields from 5 to 20 Tesla.

Non-uniform heat distribution results in inhomogeneous reduction of the feed material. Furthermore, additional heat generated by excessive reaction rates can result in material agglomeration, which in turn, may inhibit the diffusion of the reducing gas. The present process allows the reaction rate to be moderated by applying a magnetic field to attract the feed material in one or more reaction zones. Control of the thermal cycle and homogeneous reduction can be achieved, as needed, by adjustment of power to the heating elements, flow of reducing gas as well as the use of magnetic field, external to the rotary tube. In certain embodiments, to maximize the reaction of the feed material with the reducing gas and to prevent material agglomeration, the feed material may be pre-treated prior to the reduction with the reducing gas. In various aspects, the particles of the feed material may be coated with soft and/or non-magnetic material to form a layer around the magnetic core of at least one or more particles while allowing the gas-solid reaction. In some examples, each of the particles may have a layer around the magnetic core.

Figure 1:
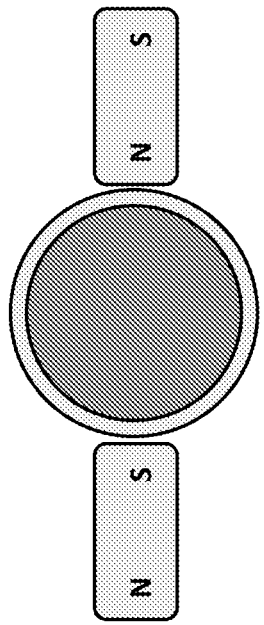
FIG. 1 illustrates cross-section views of rotating tubes with opposing magnets and stationary tubes with opposing magnets.
Figure 1:
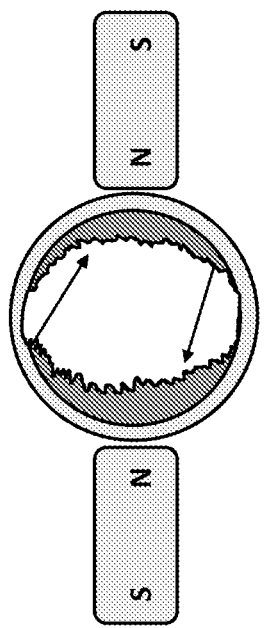
Figure 2:
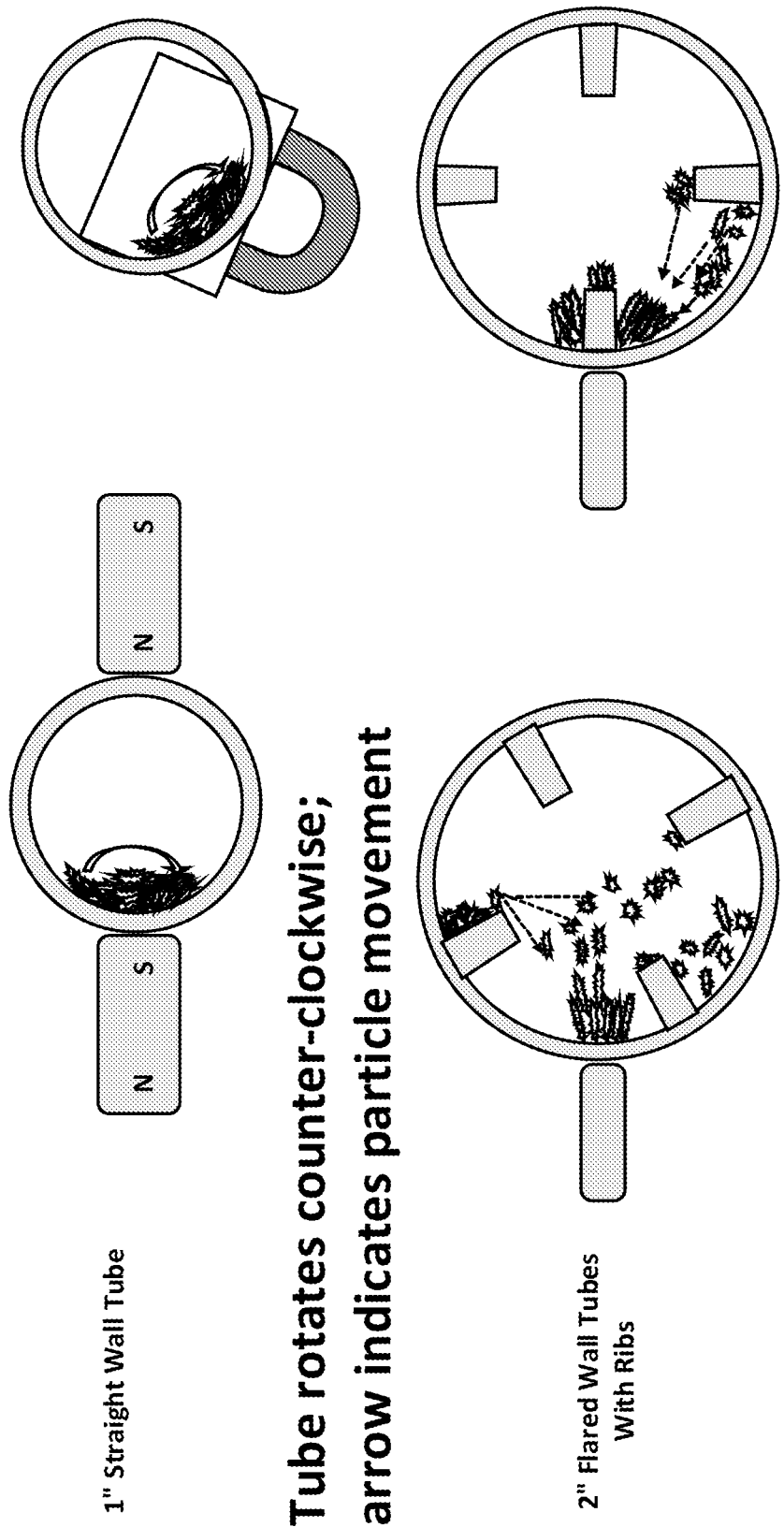
FIG. 2 illustrates cross-section views of tubes with magnets.
Figure 3:
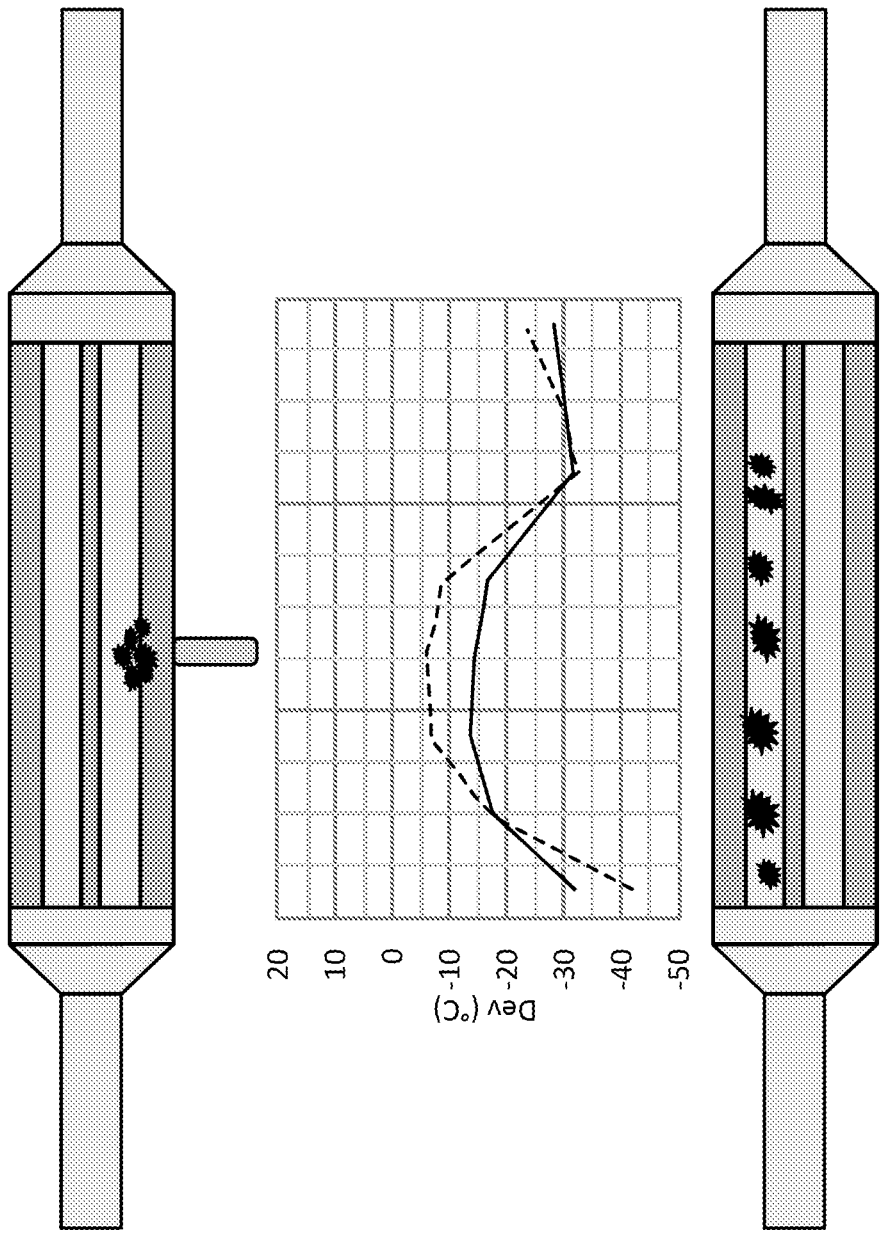
FIG. 3 illustrates a rotary tube including a flared wall tube.

A lifting element such as a rib may be employed to facilitate the mixing of the feed material with the reducing gas during rotation of the rotary tube. One or more lifting ribs may, for example, be configured in paddle-form or plate-form, in order to ensure reliable and intensive mixing and circulation of the feed material, referring again to FIGS. 2 and 3. FIGS. 2 and 3 further illustrates confinement to a region as it related to temperature profile along the tube. A 5.08 cm (2") flared wall tube with ribs and magnet assist is shown According to one embodiment, the lifting ribs run at least substantially in the radial direction of the rotary tube, which ensures intensive mixing of the feed material. The lifting ribs may be formed of solid sheets, in particular non-magnetic sheets, which facilitate the mixing of the feed material in the manner of a paddle. The lifting ribs may be made of material which is resistant to high temperature and corrosion. In one embodiment, the lifting ribs may be made of non-magnetic material. In another embodiment, the lifting ribs may be made of material which is non-magnetic and/or non-responsive to the reducing gas, the feed material or both.

The feed material includes iron. In some examples, the feed material may further include at least one of an antiferromagnetic phase, $Fe_2O_3$, FeO, FeMn, MnN, $Fe_2N$, $Fe_3N$ or their mixed phase(s). In certain aspects, the feed material may be ferromagnetic. In another example, the feed material may also include a nonmagnetic element or an element or compound selected from the group consisting of Al, Cu, Ti, Mn, Zr, Ta, B, C, Ni, Ru, $SiO_2$, $Al_2O_3$, or combinations thereof. The feed material may include other materials, such as elemental iron, cobalt, nickel, dopants, or the like. In some examples, the dopants may include at least one of aluminum (Al), manganese (Mn), lanthanum (La), chromium (Cr), cobalt (Co), titanium (Ti), nickel (Ni), zinc (Zn), a rare earth metal, boron (B), carbon (C), phosphorous (P), silicon (Si), or oxygen (O).

Figure 6:
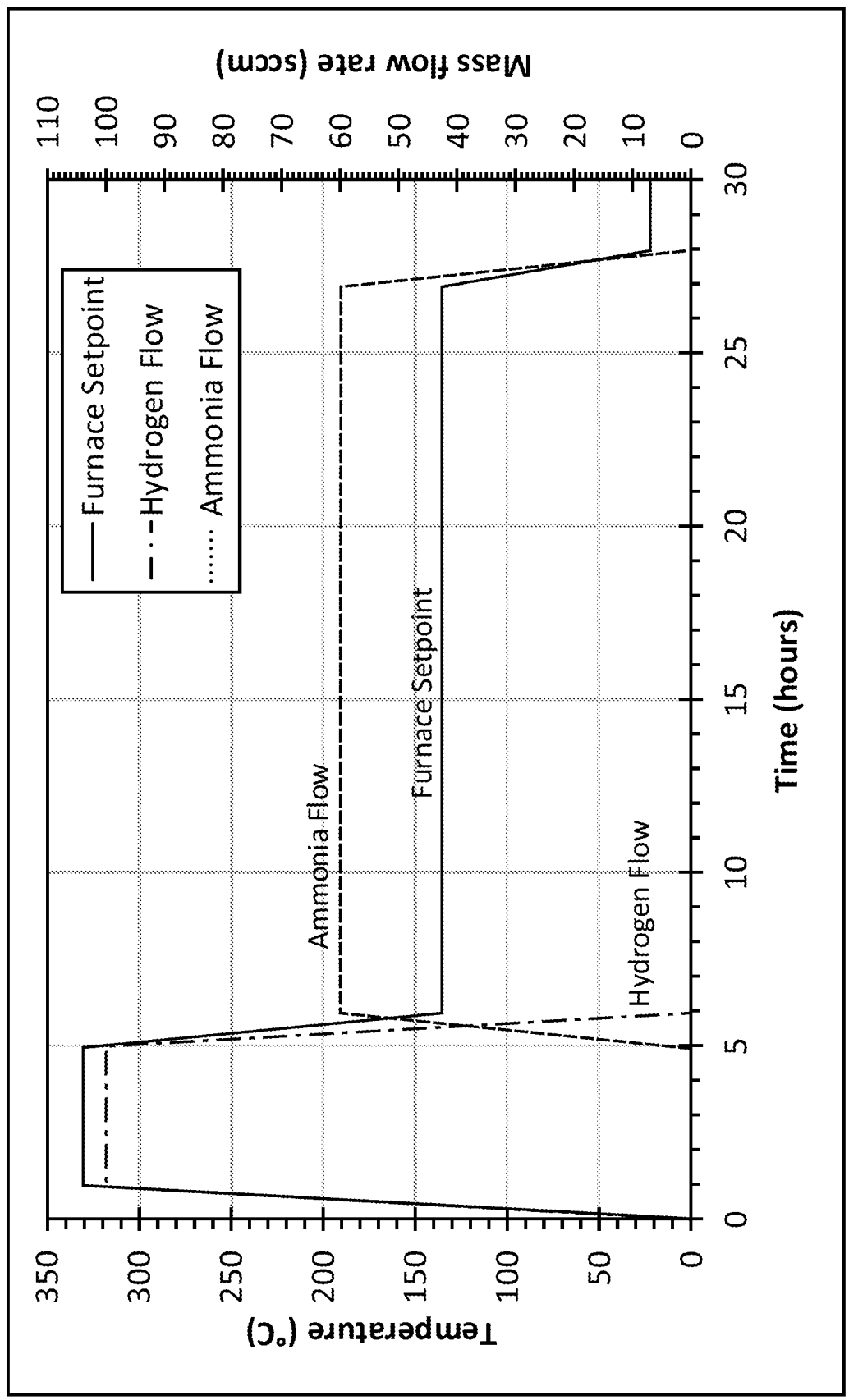
FIG. 6 is a graphical representation of temperature and gas flow versus time for a combined reduction and nitriding process.

In general, by the nitriding, nitrogen from a nitrogen source is combined with iron to form iron nitride. The nitriding may be achieved by flowing nitrogen into the feed material within the tube. Such a nitrogen source may be the same as or similar to nitrogen sources described in elsewhere in this disclosure, such as at least one of ammonia, ammonium nitrate, an amide-containing material, or a hydrazine-containing material. In some examples, nitriding may include heating a reduced material to a selected temperature for a time sufficient to allow diffusion of nitrogen to a predetermined concentration substantially throughout a volume including iron. In this manner, the heating time and temperature are related, and may also be affected by the composition and/or geometry of the volume including iron. FIG. 6 is a graphical representation of temperature and gas flow versus time for a combined reduction and nitriding process.

For example, the nitriding may take place by flowing a mixture of $NH_3$ and $H_2$ at a temperature from 100° C. to 200° C. The gas flow may be 100% $NH_3$. The nitriding time may be from 1 hour to 50 hours, more preferably 20 hours to 30 hours. In one example, the conditions are a reaction zone temperature of 135° C., a flow rate of 60 sccm in a 2.5" I.D. tube, a furnace load of 0.5 grams iron oxide, and a nitriding time of 22 hours. In a certain embodiment, reduction with hydrogen and nitriding of the feed material may be carried out in a single batch process. In another aspect, reduction with hydrogen and nitriding of the feed material may be carried out in a continuous process. In some examples, reduction with hydrogen and nitriding of the feed material may be sequentially carried out in a bath process or a continuous process.

After the nitriding, the nitride iron material may include a $Fe_{16}N_2$ phase constitution including $\alpha''$-$Fe_{16}N_2$. In some examples, at least a portion of the nitride iron material consists essentially of a $Fe_{16}N_2$ phase constitution. As used herein "consists essentially of" means that the nitride iron material includes $Fe_{16}N_2$ and other materials that do not materially affect the basic and novel characteristics of the $Fe_{16}N_2$ phase. In other examples, the nitride iron material may include a $Fe_{16}N_2$ phase constitution and a $Fe_8N$ phase constitution, e.g., in different portions of the nitride iron material.

Once the nitriding is complete, the iron nitride is removed from the furnace and manufactured into a consolidated bulk magnet. For example, a form of the bulk magnet may be a polymer matrix composite. In some examples, a workpiece may include a bulk material as described. The iron nitride materials formed by the techniques described herein may be used as magnetic materials in a variety of applications, including, for example, bulk permanent magnets. Bulk permanent magnets may include a minimum dimension of at least about 0.1 millimeters (mm). In some examples, the bulk material including iron nitride may be annealed in the presence of an applied magnetic field. In other examples, iron nitride materials may not be bulk materials (may have a minimum dimension less than about 0.1 mm), and the iron nitride materials may be consolidated with other iron nitride materials to form bulk permanent magnets. Examples of techniques that may be used to consolidate iron nitride magnetic materials are described in the art.

Substantially as used herein may refer to a value that approaches the total of a value to which it makes reference. For example, for a quantity, substantially may indicate within 20%, 10%, 5%, or within 1% of a given total value.

As used herein, the terms "about" and "at or about" mean that the amount or value in question can be the designated value, approximately the designated value, or about the same as the designated value. As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The present invention relates at least to the following clauses.

Clause 1. A rotary tube furnace configured to facilitate a chemical reaction between a solid mass and a gas in the furnace, comprises: a reaction chamber extending through the furnace, the reaction chamber configured to control ingress and egress of each of the solid mass and the gas in the reaction chamber; a passage way configured to supply the solid mass to the reaction chamber; a passage way configured to supply and circulate the gas through the reaction chamber; a heater providing heat to the reaction chamber and configured to control a reaction temperature in the reaction chamber; a magnetic field source in proximity to the reaction chamber for generating a magnetic field to one or more reaction zones of the reaction chamber; wherein the reaction chamber provides for mixing the solid mass and the gas.

Clause 2. According to Clause 1, the magnetic field source is adjustably located to define the one or more reaction zones between the solid mass and the gas within the reaction chamber.

Clause 3. According to Clause 1, the reaction chamber is a cylindrical tube configured to rotate around a longitudinal axis of the reaction chamber during the reaction.

Clause 4. According to Clause 1, the rotary tube furnace further comprises one or more lifting members on an inner periphery of the reaction chamber configured to lift the solid mass during rotation of the reaction chamber.

Clause 5. According to Clause 4, the lifting members are configured to sweep the solid mass towards the magnetic field source from a bottom of the reaction zone.

Clause 6. According to Clause 1, a plurality of lifting members are equally spaced apart on the inner periphery of the reaction chamber.

Clause 7. According to Clause 1, the gas comprises nitrogen, hydrogen or any combination thereof.

Clause 8. According to Clause 1, the solid mass comprises particles comprising iron.

Clause 9. According to Clause 1, the reaction chamber comprises a flared wall tube.

Clause 10. According to Clause 1, the magnetic field source comprises a permanent magnet, an electromagnet, or any combination thereof.

Clause 11. According to Clause 1, the magnetic field source comprises a plurality of permanent magnets.

Clause 12. According to Clause 1, an even number of permanent magnets are symmetrically located around a center axis of the reaction chamber.

Clause 13. A process for carrying out a solid-gas reaction in a rotary tube furnace, comprises: configuring a reaction chamber to control ingress and egress of each of a solid mass and a gas in the chamber; supplying the solid mass to the reaction chamber; supplying the gas to the reaction chamber; circulate the gas through the reaction chamber; applying a magnetic field to the solid mass; rotating the reaction chamber; and heating the reaction chamber to a reaction temperature in the presence of the magnetic field while rotating the reaction chamber.

Clause 14. According to Clause 13, the process further comprises: locating a magnet to generate the magnetic field and define one or more reaction zones between the solid mass and the gas within the reaction chamber.

Clause 15. According to Clause 13, the rotary tube furnace further comprises a flow interrupter within the reaction chamber configured to cause non-uniform mixing of the solid mass with the gas during rotation of the reaction chamber.

Clause 16. According to Clause 13, the solid mass comprises particles comprising iron.

Clause 17. According to Clause 13, the gas comprises nitrogen, hydrogen, or any combination thereof.

Clause 18. According to Clause 13, the magnet comprises a permanent magnet.

Clause 19. According to Clause 13, the process further comprises: symmetrically locating a plurality of permanent magnets around a center axis of the reaction chamber.

Clause 20. According to Clause 13, the gas comprises hydrogen.

Clause 21. A process for reacting solid magnetic particles with a gas, where the process comprises the following steps: applying a magnetic field to solid magnetic particulates present in a reaction chamber, the magnetic field configured to confine the solid magnetic particulates within a reaction zone adjacent to, or directly adjacent to, an inner wall of the reaction chamber, the reaction chamber configured with one or more structures, whereby said structures give rise to the solid magnetic particulates tumbling in the reaction zone as the reaction chamber is rotated; rotating the reaction chamber around a longitudinal axis of the reaction chamber to tumble the solid magnetic particulates in the reaction zone; and heating the solid magnetic particulates in the presence of a reaction gas in the reaction zone to react the solid magnetic particles with the gas.

Clause 22. According to Clause 21, the structures protrude out of, or into, or both, the inner wall of the reaction chamber.

Clause 23. According to Clause 21, the gas comprises hydrogen.

Clause 24. According to Clause 22, the structures comprise one or more ribs protruding longitudinally along the inner surface of the reaction zone.

Clause 25. According to Clause 22, the temperature of the solid magnetic particles within the reaction zone varies by no more than 50° C. during the reaction.

Clause 26. According to Clause 22, the temperature of the solid magnetic particles within the reaction zone varies by no more than 20° C. during the reaction.

Clause 27. According to Clause 22, further comprising: nitriding the solid magnetic particulates after the reaction with the gas to obtain iron-nitride solids.

Clause 28. A bulk magnet comprising iron-nitride solids obtained by the process according to Clause 27, wherein at least one of the iron-nitride solids has a non-magnetic shell 0.1 to 2.0 nm thick surrounding a magnetic core of the least one iron-nitride solid.

Clause 29. According to Clause 28, at least one of the iron-nitride solids is spherical.

Clause 30. According to Clause 29, at least one of the iron-nitride solids is non-spherical, where a shape the non-spherical solid has an aspect ratio greater than 1.

Clause 31. According to Clause 29, the at least iron-nitride solid comprises $\alpha''$-$Fe_{16}N_2$.

Clause 32. According to Clause 31, the core has greater than 50 weight % of $\alpha''$-$Fe_{16}N_2$.

Clause 33. According to Clause 28, a saturation magnetization of the bulk magnet is greater than or equal to 180 emu/g.

Clause 34. According to Clause 28, an intrinsic coercivity of the bulk magnet is greater than or equal to 2,000 Oe.

Clause 35. According to Clause 28, the bulk magnet is a permanent magnet.

Clause 36. A rotary tube furnace configured to facilitate a chemical reaction between a solid mass and a gas in the furnace, comprising: a reaction chamber extending through the furnace, the reaction chamber configured to control ingress and egress of each of the solid mass and the gas in the reaction chamber; a passage way configured to supply the solid mass to the reaction chamber; a passage way configured to supply the gas to the reaction chamber and circulate the gas through the reaction chamber; a heater providing heat to the reaction chamber and configured to control a reaction temperature in the reaction chamber; a magnetic field source in proximity to the reaction chamber for generating a magnetic field to one or more reaction zones of the reaction chamber; wherein the reaction chamber provides for mixing the solid mass and the gas.

Clause 37. The rotary tube furnace according to Clause 36, wherein the magnetic field source is adjustably located to define the one or more reaction zones between the solid mass and the gas within the reaction chamber.

Clause 38. The rotary tube furnace according to Clause 36, wherein the reaction chamber is a cylindrical tube configured to rotate around a longitudinal axis of the reaction chamber during the reaction.

Clause 39. The rotary tube furnace according to Clause 38, further comprising: one or more lifting members on an inner periphery of the reaction chamber configured to lift the solid mass during rotation of the reaction chamber.

Clause 40. The rotary tube furnace according to Clause 39, wherein the lifting members are configured to sweep the solid mass towards the magnetic field source from a bottom of the reaction zone.

Clause 41. The rotary tube furnace according to Clause 39, wherein a plurality of lifting members are equally spaced apart on the inner periphery of the reaction chamber.

Clause 42. The rotary tube furnace according to Clause 36, wherein the solid mass has a particulate form comprising iron-nitride particles having a non-magnetic shell 0.1 to 2.0 nm thick surrounding a magnetic core of the iron-nitride particles, and the passageway configured to supply the solid mass to the reaction chamber includes a conveyor system capable of transporting the iron-nitride particles into and out of the reaction chamber.

Clause 43. A process for reacting solid magnetic particles with a gas, the process comprising the following steps: applying a magnetic field to solid magnetic particulates present in a reaction chamber, the magnetic field configured to confine the solid magnetic particulates within a reaction zone adjacent to, or directly adjacent to, an inner wall of the reaction chamber, the reaction chamber configured with one or more structures, whereby said structures give rise to the solid magnetic particulates tumbling in the reaction zone as the reaction chamber is rotated; rotating the reaction chamber around a longitudinal axis of the reaction chamber to tumble the solid magnetic particulates in the reaction zone; and heating the solid magnetic particulates in the presence of a reaction gas in the reaction zone to react the solid magnetic particles with the gas.

Clause 44. The process of Clause 43, wherein the structures protrude out of, or into, or both, the inner wall of the reaction chamber.

Clause 45. The process of Clause 43, wherein the gas comprises hydrogen.

Clause 46. A bulk magnet comprising iron-nitride solids obtained by the process according to Clause 43, wherein at least one of the iron-nitride solids has a non-magnetic shell 0.1 to 2.0 nm thick surrounding a magnetic core of the least one of iron-nitride solids.

Clause 47. The bulk magnet according to Clause 46, wherein at least one of the iron-nitride solids is spherical.

Clause 48. The bulk magnet according to Clause 46, wherein at least one of the iron-nitride solids is non-spherical, where a shape the non-spherical solid has an aspect ratio greater than 1.

Clause 49. The bulk magnet according to Clause 46, wherein the iron-nitride solid comprises $\alpha''\text{-Fe}_{16}\text{N}_2$.

Clause 50. The bulk magnet according to Clause 49, wherein the core has greater than 50 weight % of $\alpha''\text{-Fe}_{16}\text{N}_2$.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotary tube furnace configured to facilitate a chemical reaction between a solid mass and a gas in the furnace, comprising:
   a reaction chamber extending through the furnace, the reaction chamber configured to control ingress and egress of each of the solid mass and the gas in the reaction chamber;
   a passage way configured to supply the solid mass to the reaction chamber;
   a passage way configured to supply the gas to the reaction chamber and circulate the gas through the reaction chamber;
   a heater providing heat to the reaction chamber and configured to control a reaction temperature in the reaction chamber;
   a magnetic field source in proximity to the reaction chamber for generating a magnetic field to one or more reaction zones of the reaction chamber;
   wherein the reaction chamber provides for mixing the solid mass and the gas;
   wherein the solid mass has a particulate form comprising iron-nitride particles having a non-magnetic shell 0.1 to 2.0 nm thick surrounding a magnetic core of the iron-nitride particles.

2. The rotary tube furnace according to claim 1, wherein the magnetic field source is adjustably located to define the one or more reaction zones between the solid mass and the gas within the reaction chamber.

3. The rotary tube furnace according to claim 1, wherein the reaction chamber is a cylindrical tube configured to rotate around a longitudinal axis of the reaction chamber during the reaction.

4. The rotary tube furnace according to claim 3, further comprising:
   one or more lifting members on an inner periphery of the reaction chamber configured to lift the solid mass during rotation of the reaction chamber.

5. The rotary tube furnace according to claim 4, wherein the lifting members are configured to sweep the solid mass towards the magnetic field source from a bottom of the reaction zone.

6. The rotary tube furnace according to claim 4, wherein a plurality of lifting members are equally spaced apart on the inner periphery of the reaction chamber.

7. The rotary tube furnace according to claim 1, wherein the passageway is configured to supply the solid mass to the reaction chamber includes a conveyor system capable of transporting the iron-nitride particles into and out of the reaction chamber.

\* \* \* \* \*